United States Patent
Xiong et al.

(10) Patent No.: US 10,447,992 B1
(45) Date of Patent: Oct. 15, 2019

(54) IMAGE PROCESSING METHOD AND SYSTEM

(71) Applicant: UBTECH Robotics Corp, Shenzhen (CN)

(72) Inventors: Youjun Xiong, Shenzhen (CN); Cihui Pan, Shenzhen (CN); Shengqi Tan, Shenzhen (CN); Xianji Wang, Shenzhen (CN); Jianxin Pang, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 0 days.

(21) Appl. No.: 16/104,143

(22) Filed: Aug. 17, 2018

(30) Foreign Application Priority Data

Jun. 11, 2018 (CN) .......................... 2018 1 0596592

(51) Int. Cl.
*H04N 13/221* (2018.01)
*G06T 1/00* (2006.01)
*H04N 13/296* (2018.01)
*G06T 7/174* (2017.01)
*H04N 13/00* (2018.01)

(52) U.S. Cl.
CPC ......... *H04N 13/221* (2018.05); *G06T 1/0014* (2013.01); *G06T 7/174* (2017.01); *H04N 13/296* (2018.05); *G06T 2207/10012* (2013.01); *H04N 2013/0085* (2013.01)

(58) Field of Classification Search
USPC ........................................................ 348/135
See application file for complete search history.

(56) References Cited

U.S. PATENT DOCUMENTS

| | | | | |
|---|---|---|---|---|
| 2006/0025888 A1* | 2/2006 | Gutmann | ........... | G06K 9/00664 700/245 |
| 2014/0079314 A1* | 3/2014 | Yakubovich | ......... | G06K 9/6254 382/159 |
| 2015/0243324 A1* | 8/2015 | Sandrew | .............. | G11B 27/031 386/278 |

* cited by examiner

*Primary Examiner* — Behrooz M Senfi

(57) ABSTRACT

The present disclosure discloses a method and a system for image processing. The method includes: obtaining images of a target environment captured by a robot in a preset movement trajectory according to a predefined condition; combining every two of the images having a same region into a corresponding image pair based on an initial position estimation of each of the images; producing an image seed based on the image pair; performing position optimization on the image seed; producing an image subset based on the image seed after the position optimization; and performing position optimization on the image subset based on the image seeds in the image subset. It can effectively reduce the computational complexity of image matching, reduce the calculation time, and improve the accuracy of image processing.

20 Claims, 5 Drawing Sheets

IMAGE PROCESSING METHOD AND SYSTEM

CROSS REFERENCE TO RELATED APPLICATIONS

This application claiams priority to Chinese Patent Application No. 201810596592.6, filed Jun. 11, 2018, which is hereby incorporated by reference herein as if set forth in its entirety.

BACKGROUND

1. Technical Field

The present disclosure relates to three-dimensional reconstruction technology, and particularly to a method and a system for image processing.

2. Description of Related Art

The structure from motion reconstruction algorithm is the most commonly used core algorithm in three-dimensional reconstruction technology. Among the three-dimensional reconstruction software, the more creative and influential ones all use the algorithm to perform three-dimensional reconstruction. For example, the software Bundler uses the algorithm to perform three-dimensional reconstruction. In Bundler, the projection matrix and three-dimensional structure of the incremental image matching recovery camera is adopted.

However, for the methods in the prior art, when performing image matching, it needs to determine the matching of each image with all the other images. Therefore, the matching complexity is high, the requirement for computing resource is much, and in the process of performing the initialization of the traditional incremental three-dimensional reconstruction, all the matchings between images are needed to be optimized by the bundle adjustment (BA), and many times of BA optimizations are required. However, the above-mentioned initialization of the traditional incremental method which requires multiple BA optimizations has the following disadvantages: first, the number of calculations is large, the time consumption is much, and the efficiency is reduced; second, the traditional incremental method depends on the selection of the initial image pairing, and the dependency will cause the unstability problem of algorithm, which reduces the accuracy of image processing.

Therefore, a new image processing method is urgently needed to solve the above-mentioned problems.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

The technical solutions in the embodiments of the present disclosure will be clearly and completely described in the following with reference to the accompanying drawings in the embodiments of the present disclosure. Apparently, the described embodiments are merely part of the embodiments of the present disclosure, but not all of the embodiments. All other embodiments obtained by those skill ed in the art based on the embodiments of the present disclosure without creative efforts shall fall within the protection scope of the present disclosure.

Figure 1:
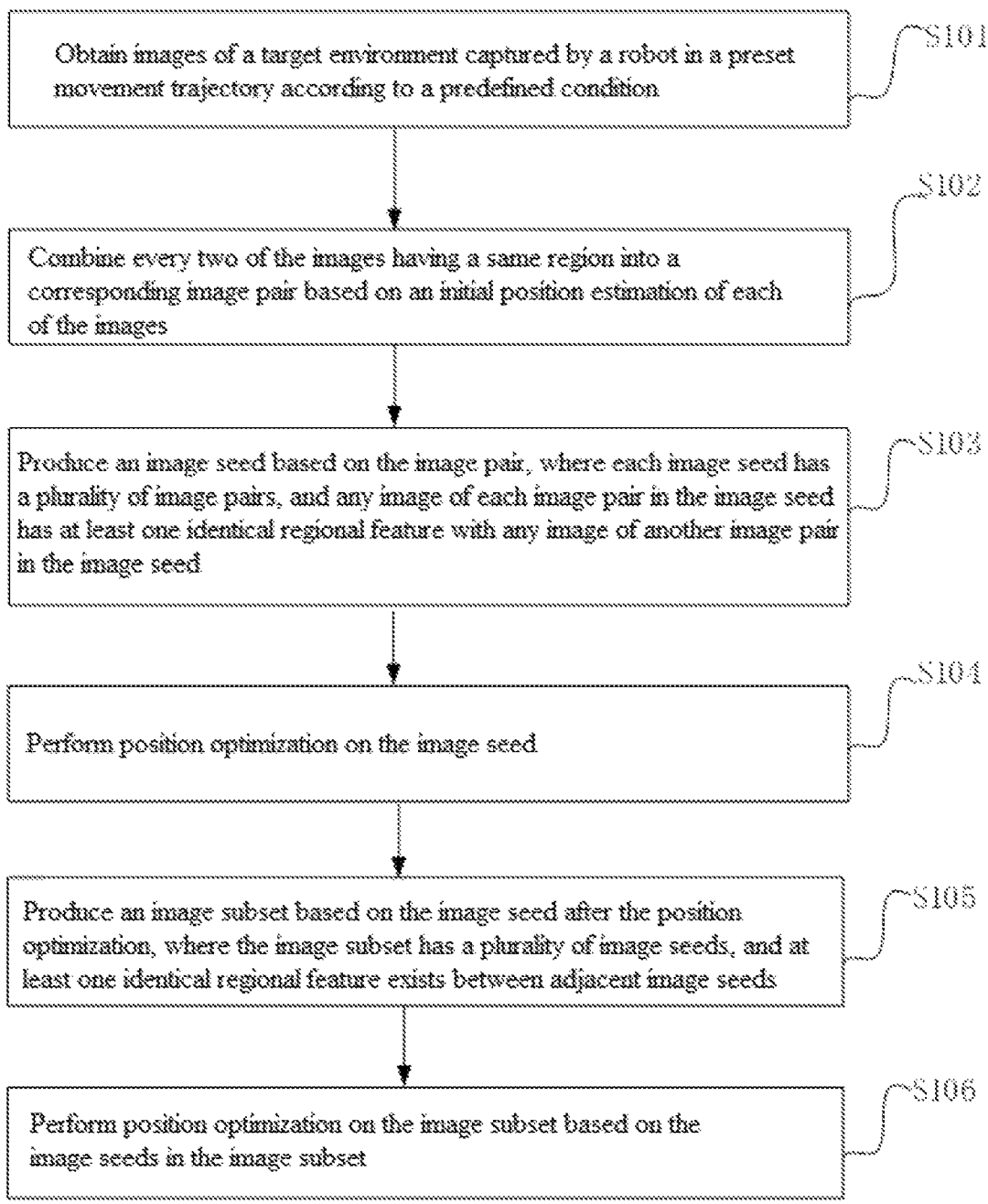
FIG. 1 is a flow chart of an embodiment of an image processing method according, to the present disclosure.

FIG. 1 is a flow chart of an embodiment of an image processing method according to the present disclosure. In this embodiment, the method is a computer-implemented method executable for a processor. The image processing method of the present disclosure is applied to a robot, which may be the robot for sliding or walking on the around, and may of course be an unmanned aerial vehicle following, which is not limited herein. As shown in FIG. 1, the method includes the following steps.

S101: obtaining images of a target environment captured by a robot in a preset movement trajectory according to a predefined condition.

In the case of capturing images for a predefined region which needs to perform a three dimensions reconstruction through the robot, it generally needs to set a movement trajectory of the robot in advance, so that the robot can capture the images of the predefined region in the preset movement trajectory according to the predefined condition. The predefined condition includes a preset photographing frequency and a specific photographing position.

In this embodiment, the movement trajectory of the robot is an advance trajectory of the robot. In a specific embodiment, if the robot is an unmanned aerial vehicle for flying in the air, the movement trajectory is a flight trajectory of the unmanned aerial vehicle. Preferably, in order to make the robot more stable in flight so as to obtain higher quality images, in a preferred embodiment, the flying height of the robot is constant, the preset movement trajectory is a straight line, the corner between straight lines is a right angle, and the robot moves linearly in a uniform speed along the preset movement trajectory.

In other embodiments, if there is a practical necessary, the preset movement trajectory of the robot may also include curved line(s) and/or broken line(s), or the included angle in the preset movement trajectory may not be a right angle, and the movement manner of the robot may also he a variable speed movement, on condition that the position of the robot during moving in the preset movement trajectory can be determined according to the movement manner and the preset movement trajectory, and the images obtained through the movement trajectory can be used in the three-dimensional reconstruction of the predefined region, which is not limited herein.

In this embodiment, in order to obtain more accurate images of a photographing area and reduce the difficulty of image matching, the robot captures the images of the predefined region at some specific photographing positions. In this embodiment, the specific photographing position includes a turning point at which the robot moves along the above-mentioned preset movement trajectory. When the robot reaches the turning point, the images of the predefined region is captured first before turning, the turning point is used as the starting point to continue capturing the images of the predefined region at the preset photographing frequency after turning along the preset movement trajectory by, for example, 90 degrees.

In other embodiments, in accordance with actual needs, the position other than the turning point in the preset movement trajectory may be used as the specific photographing position, which is not limited herein.

It should be noted that, in order to ensure the photographing effect, the robot maintains horizontal while photographing. In a preferred embodiment, the robot keeps horizontal throughout the entire photographing process.

For example, in a specific implementation scenario, the predefined region is a horizontal plane, and the, preset movement trajectory includes straight line(s) and/or right angle(s). The robot makes a uniform linear movement on the horizontal plane along the preset movement trajectory at a predetermined height to capture the images of the horizontal plane and obtain image information of each image. If the robot is a robot for sliding or walking on the ground, the height is zero or greater than zero, in which the height of zero means that the robot moves on the horizon, and the height of greater than zero means that the robot moves on a slope or stairs above the horizontal plane. If the robot is an unmanned aerial vehicle, the height of greater than zero means that the robot moves over the sky higher the horizontal plane. In order to facilitate image matching, when the robot encounters a right angle, the robot captures the images of the predefined region at a right angle first, rotates for 90 degrees in situ while keeping horizontal so that the robot is located on the next trajectory connected with the right angle, captures the images of the predefined region again after the robot rotates for 90 degrees, and then continues to move along the next trajectory.

In another embodiment, in accordance with actual needs, if the photographing frequency of the robot is not fixed, in order to realize a more accurate three-dimensional reconstruction, a photographing area overlap ratio corresponding to the images captured by the robot in the adjacent time period needs to be higher than a photographing area overlap ratio of the images captured in the non-adjacent time period for a certain threshold, that is, the photographing areas corresponding to the images captured in the adjacent time period are at least partially identical, which is not limited herein.

S102: combining every two of the images having a same region into a corresponding image pair based on an initial position estimation of each of the images.

In which, the initial position estimation includes a three-dimensional coordinates and a three-dimensional space angle of the images, for example, the three-dimensional coordinates and the three-dimensional space angle of the robot when the robot captures the images. In one embodiment, the initial position estimation can be obtained through sensors of the robot, for instance, obtaining the three-dimensional coordinates through a location sensor (e.g., a GPS sensor) and obtaining the three-dimensional space angle through an angle sensor (e.g., a gyroscope).

In this embodiment, a robot movement data model can be obtained through positioning information of the robot itself when capturing the images, the movement manner of the robot, and the preset movement trajectoty, and calculate position information of the robot, thereby further obtaining the three-dimensional coordinate and the three-dimensional space angle of the robot, that is, the initial position estimation of the images, when the robot captures the images.

Specifically, the three-ditnensional coordinates of the robot can be obtained by performing weighted averaging on photographing positioning information of the robot and the calculated position information of the robot, the weight of the three-dimensional coordinates can be determined through the uncertainty of the data, or select the most accurate weight a the three-dimensional coordinates as the weight for calculating the three-dimensional coordinates from multiple weight ratios of the preset photographing positioning information and the calculated position information of the robot.

In other embodiments, the three-dimensional coordinates of the images may also be obtained through other methods such as Kalman filtering or other filtering methods, which is not limited herein.

In this embodiment, three-dimensional space angle information of the robot may be determined by inertial measurement unit (IMU) information of the robot itself and preset movement posture information of the robot when the robot captures the images. Preferably, in order to simplify the calculation amount, the robot keeps a horizontal posture to move while the robot moves along the preset movement trajectory.

Ater obtaining the initial position estimation of the images, the photographing area corresponding to the images may be obtained according to the initial position estimation, and whether the photographing areas of any two images are overlapped is determined. If they overlap, the two images may theoretically be combined into the corresponding image pair. However, since the images obtained according to the initial position estimation may not be accurately corresponding to the photographing area, it is necessary to further determine whether the two images can form the image pair by determining whether the two images have an identical regional feature. If the identical regional feature exists in the two images, the two images are determined as one set of the image pairs.

Specifically, the robot extracts one regional feature of one of the two images of the image pair, and determines the position of the regional feature in the other image according to the initial position estimation of the two images. In order to reduce the possible error, the robot searches in the predefined region of the position to determine that whether the identical regional feature exists in the other image. In a preferred embodiment, the predefined region is an area centered on the above-mentioned position.

If there is the identical regional feature in the predefined region, the two images can be determined as a set of image pairs.

If the identical regional feature is not matched in the predefined region of the other image, the other image is rotated to obtain the initial position estimation after the image is rotated, the position of the regional feature of the images in the other image is re-detemined according to the initial position estimation after the rotation, and it is further searched in the predefined region of the above-mentioned position in the other image to determine that whether the identical regional feature exists. If it exists, the two images may be combined into the image pair. In which, the angle and direction of the rotation can be set in advance according to the movement trajectory and a movement posture of the robot, for instance, rotates for 30 degrees, 4 degrees, or 90 degrees in each time, while the rotation direction is clockwise or counterclockwise.

If the identical regional feature is still not had been detected in the predefined region of the two images, a global search matching method is used to match one of the images with all the images captured by the robot to obtain the image(s) having the identical regional features as the image, and the two images are combined into the image pair.

In comparison with the conventional method that searches through global search directly, the method that determining whether the two images can form the image pair by determining Whether the images of the same area contain the identical regional features first. In addition to quickly eliminate the image pair which is impossible to match and reduce the probability of mismatching, ate complexity of the image matching in a system can be reduced from $O(n*n)$ to $O(n)$, which effectively reduces the workload of image matching and improves the efficiency of three-dimensional reconstruction.

In this embodiment, the internal parameters of a camera may include the focal length, the resolution, the radial direction, the camera distortion coefficient, and the like which are the data may be used for three-dimensional reconstruction, which is not limited herein.

In this embodiment, the processor 42 can use an oriented fast and rotated brief (ORB) algorithm to extract features Through the ORB algorithm, the feature extraction can be speeded up without reducing the accuracy of the regional feature of the captured images which not causes impacts in the subsequent processing.

In other embodiments, other feature extraction algorithms, for example, algorithms based on template, edge, grayscale, and space, may be adopted according to a motion model and the movement posture of the robot, to extract the predefined regional feature of each image, which is not repeated again herein.

In the above-mentioned embodiment, the extracted predefined regional feature of each image may be the predefined regional feature such as a grayscale, an angle, an edge, a region, a ridge of the image which may be used for computer recognition and classification, which is not repeated again herein.

S103: producing an image seed based on the image pair, where each image seed has a plurality of image pairs, and any image of each image pair in the image seed has at least one identical regional feature with any image of another image pair in the image seed.

Specifically, it is determined whether a part of the image pairs which not have the identical regional feature with the other image pairs exists, based on the initial position estimation of the images captured b the robot. If the part of the image pairs which not have the identical regional feature with the other image pairs exists, the part of the image pans is deleted: the images which have the identical regional feature between an two images are obtained from the remaining image pairs, and the images with the identical regional feature are placed in a same image seed.

Alter deleting the part of the image pairs which not have the identical regional feature with the other image pairs, the image seed is formed through the remaining image pairs.

Figure 2:
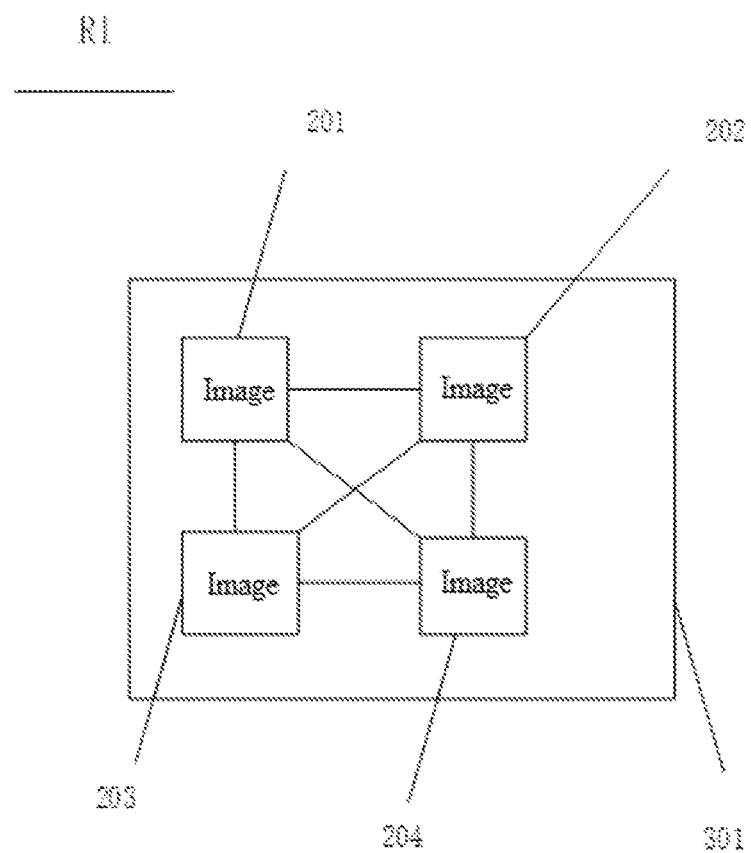
FIG. 2 is a schematic diagram of an embodiment of an image seed obtained in the image processing method of FIG. 1.

In this embodiment, the image seed can he constructed by generating a undirected graph $G=(V, E)$ based on the remaining image pairs. Specifically, in the undirected graph $G=(V, E)$, each vertex represents one image, and the line between two vertices represents that there is an identical regional feature between two of the images, that is, an image pair is formed. Correspondingly, after generating the undirected graph based on the remaining image pairs, a fully connected subgraph in the undirected graph, that is, the fully connected subgraph including the largest number of images is obtained, and an image set corresponding to the fully connected subgraph is taken as one image seed R1. FIG. 2 is a schematic diagram of an embodiment of an image seed obtained in the image processing method of FIG. 1. As shown in FIG. 2, in FIG. 2, two of the images having the identical regional feature are connected by a line, and it can be seen that the images 201, 202, 203, and 204 have the identical regional feature as any other image, that is, the image pair composed of an two images in FIG. 2 have the identical regional feature with the image pair composed of any other two images, therefore, the images 201, 202, 203, and 204 are placed in one image seed 301.

After obtaining the image seed 301, the image(s) included in the image seed 301 in the undirected graph is removed, and the fully connected subgraph containing the largest number of images is continuously searched from the remaining images of the undirected graph, and the image set corresponding to the fully connected subgraph is taken as a new image seed. Repeatinu the above-mentioned steps, the image seeds 301, 302, 303, and 304 shown in FIG. 3 can be therefore obtained. In this embodiment, the number of the image seeds may be set to be less than a predetermined value in advance, where the predetermined value may be set to 3, 4, or other numbers according to actual needs, which is not limited herein. Of course, it is also possible not to set the predetermined value and repeats the above-mentioned steps until new image seeds can not be found in the undirected graph.

S104: performing position optimization on the image seed.

In a preferred embodiment, in order to improve the position optimization efficiency, position optimization is performed on a plurality of image seeds in a parallel manner.

Figure 3:
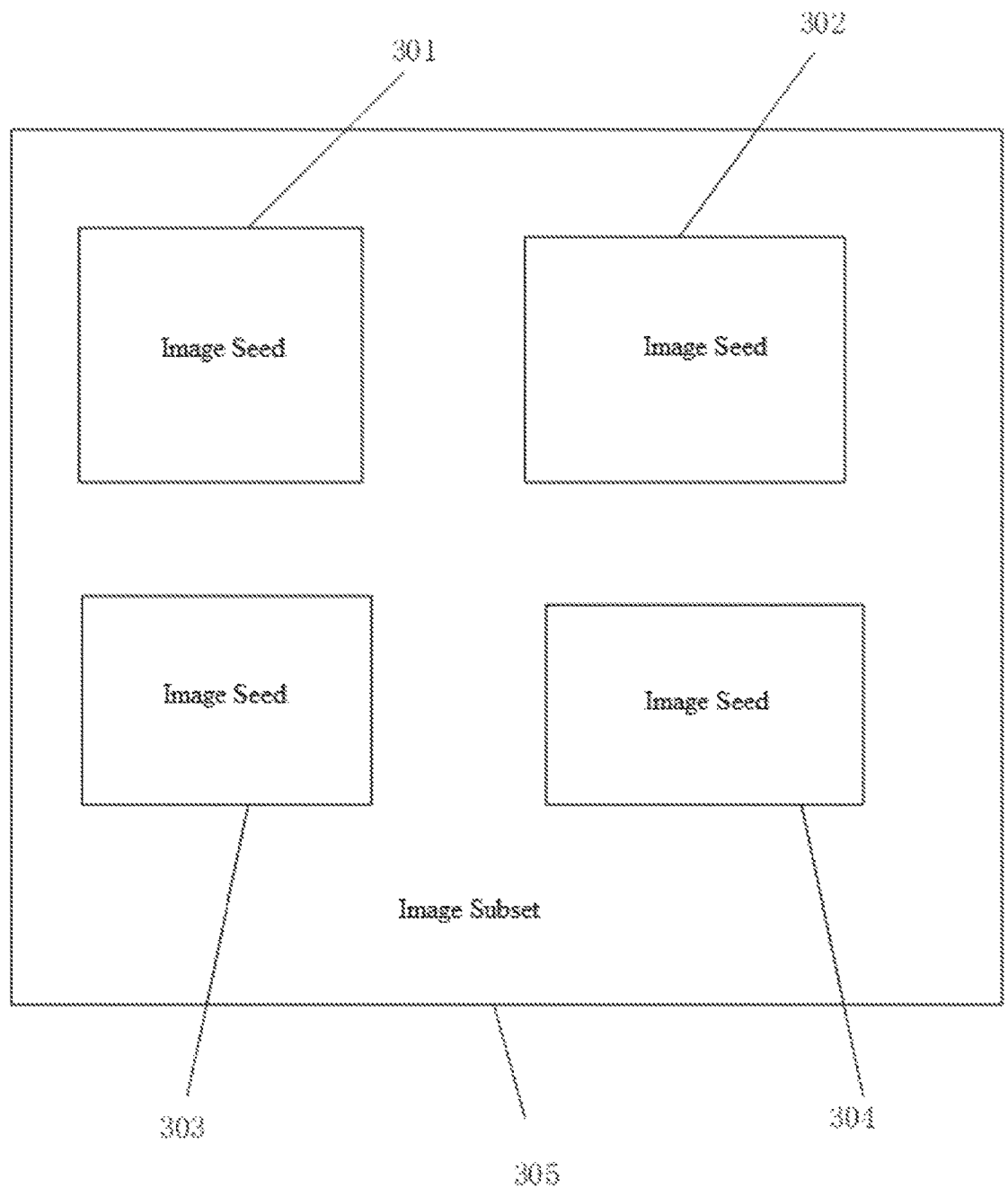
FIG. 3 is a schematic diagram of an embodiment of an image subset obtained in the image processing method of FIG. 1.

In a specific embodiment, after obtaining a plurality of image seeds, taking the four image seeds in FIG. 3 as an example, the obtained four image seeds are processed through the bundle adjustment (BA) in a parallel manner first, and a iteratively processing is performed through the bundle adjustment to obtain the position estimation of the images after obtaining an estimated positon of each image in each image seed. through the bundle adjustment. In which, the estimated positon of the image is a back projection error obtained through the initial position estimation of the image plus a regular term, and the position estimation of the image is the photographing position and the three-dimensional space angle after the image optimization.

Since the initial position estimation is obtained by auxiliary information of the robot, for example, GPS, trajectory design, and IMU data, it is closer to the actual photographing position of the robot. Therefore, it is more accurate to obtain the estimated positon of the images according to the initial position estimation. When iterative processing is performed to obtain the position estimation of the images, performing iterative processing with the estimated positon as the starting point will greatly reduce the number of convergence and reduce the calculation time.

S105: producing an image subset based on the image seed after the position optimization, where the image subset has a plurality of image seeds, and at least one identical regional feature exists between adjacent image seeds.

S106: performing position optimization on the image subset based on the image seeds in the image subset.

In a specific embodiment, after the bundle adjustment processing is performed on the four image seeds 301, 302, 303, and 304 of the above-mentioned, embodiment to obtain the position estimation of the images of each image seed, the four image seeds are formed as an image subset 305, each image seed is taken as an entirety, the relative positional relationship between the image seeds is obtained based on the position estimation of the images in the image seed, and the relative positional relationship between the image seeds 301, 302, 303, and 304 is marked as an edge constraint between the image seeds. The edge constraint between the image seeds 301, 302, 303, and 304 is taken as the initial location, and an accurate photographing position of the images in the image seed is obtained by performing a global bundle adjustment processing on the position estimation of all the images captured by the robot based on the initial location. In which, the accurate photographing position includes a three-dimensional coordinate and a three-dimensional space angle of a camera when the robot captures images.

In this embodiment, the method for obtaining the relative positional relationship between the image seeds 301, 302, 303, and 304 includes: determining whether any image in one image seed includes an identical regional feature with the images of another image seed, and if it includes, the corresponding photographing position and the photographing area of the image are obtained based on the position estimation of the image (of the another image seed) including the identical regional feature, so as to obtain the relative positional relationship of the image including the identical regional feature. The relative positional relationship is a relative positional relationship between the two image seeds.

In the above-mentioned embodiment, the present disclosure obtains the accurate photographing position of each image through the bundle adjustment. In other embodiments, other algorithms capable of extracting the accurate photographing position of the images from the multi-view information may also be adopted, which is not limited herein.

The advantageous effects of the preset disclosure are as follows. Different from the prior art, when the robot captures images at the preset photographing frequency, the present disclosure obtains the initial position estimation of each image, and combines two images having a same region based on the initial position estimation to reduce the image matching complexity. The image seed is produced based on the image pair, the position optimization is performed on the image seed, the image subset is produced based on the optimized image seed, and the position optimization is performed on the image subset based on the image seeds in each image subset, which is capable of further reducing the computational complexity of image matching in an effective manner, reducing the calculation time, and improving the accuracy of image processing.

Figure 4:
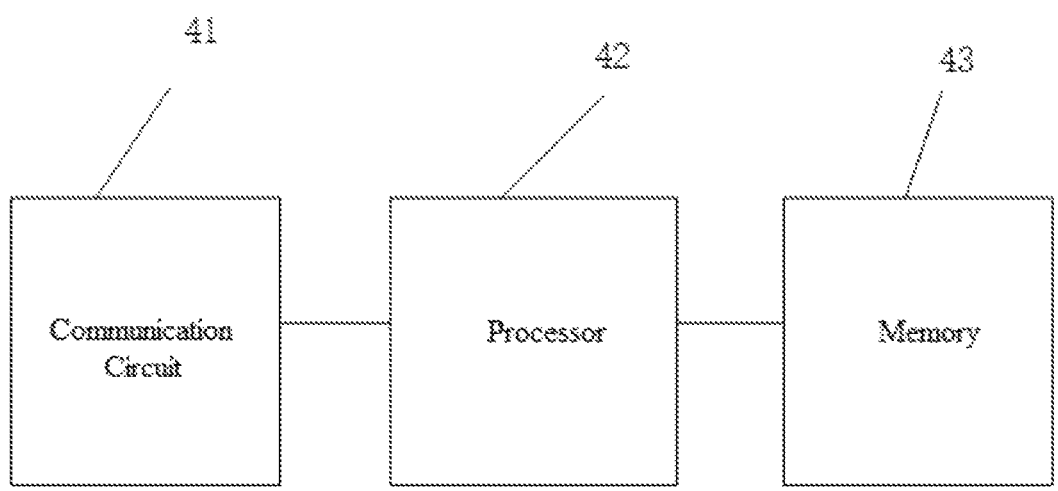
FIG. 4 is a schematic diagram of an embodiment of an image processing system according to the present disclosure.

Based on the same inventive concept, the present disclosure further provides an image processing system. In this embodiment, the image processing system implements the image processing method of any of the above-mentioned embodiments. FIG. 4 is a schematic diagram of an embodiment of an image processing system according to the present disclosure.

As shown in FIG. 4, in this embodiment, the image processing system includes a communication circuit 41, a processor 42 and a memory 43. In which, the communication circuit 41 is configured to obtain and transmit instructions, the memory 43 is configured to store images, image information of images, preset photographing frequencies, specific photographing positions, initial position estimations, photographing parameters of a robot, image pairs, identical regional features, image subsets, image seeds, image capturing positions, a computer, program executed by the processor 42, and intermediate data, generated when the computer program is executed. The processor 42, the communication circuit 41, and the memory 43 are coupled in series. The processor 42 is configured to execute the computer program, and the processor 42 implements the following image processing method when executing the computer program.

When the processor 42 captures images of a predefined region which needs to perform three-dimensional reconstruction through the robot, it is generally required to set a movement trajectory of the robot in advance through the communication circuit 41, so that the robot is capable of capturing the images of the predefined region according to a predefined condition in the preset movement trajectory. The predefined condition includes a preset photographing frequency and a specific photographing position.

In this embodiment, the movement trajectory of the robot is an advance trajectory of the robot. In a specific embodiment, if the robot is an unmanned aerial vehicle for flying in the air, the movement trajectory is a flight trajectory of the unmanned aerial vehicle. Preferably, in order to make the robot more stable in flight so as to obtain higher quality images, in a preferred embodiment, the flying height of the robot is constant, the preset movement trajectory is a straight line, the corner between straight lines is a right angle, and the robot moves linearly in a uniform speed along the preset movement trajectory.

In other embodiments, if there is a practical necessary, the preset movement trajectory of the robot may also include curved line(s) and/or broken line(s), or the included angle in the preset movemen trajectory may not be a right angle, and the movement manner of the robot may also be a variable speed movement, on condition that the position of the robot during moving in the preset movement trajectory can be determined by the processor 42 according to the movement manner and the preset movement trajectory, and the images obtained through the movement trajectory can be used in the three-dimensional reconstruction of the predefined region, which is not limited herein.

In this embodiment, in order to obtain more accurate images of a photographing area and reduce the difficulty of image matching, the processor 42 further needs to control the robot to capture the images of the predefined region at some specific photographing positions. In this embodiment, the specific photographing position includes a turning point at which the robot moves along the above-mentioned preset movement trajectory. When the robot reaches the turning point, the images of the predefined region is captured by the processor 42 through the robot first before turning, the turning point is used as the starting point to continue capturing the images of the predefined region at the preset photographing frequency after turning along the preset movement trajectory by, for example, 90 degrees.

In other embodiments, in accordance with actual needs, the position other than the turning point in the preset movement trajectory may be used as the specific photographing position, which is not limited herein.

It should be noted that, in order to ensure the photographing effect, the processor 42 needs to make the robot to maintain horizontal while photographing the images of the predefined region. In a preferred embodiment, the robot keeps horizontal throughout the entire photographing process.

For example, in a specific implementation scenario, the predefined region is a horizontal plane, and the preset movement trajectory includes straight line(s) and right angle(s). The robot makes a uniform linear movement on the horizontal plane along the preset movement trajectory at a predetermined height to capture the images of the horizontal plane, and the processor 42 obtains image information of each image through the robot. If the robot is a robot for sliding or walking on the ground, the height is zero or greater than zero, in which the height of zero means that the robot moves on the horizon, and the height of greater than zero means that the robot moves on a slope or stairs above the horizontal plane. If the robot is an unmanned aerial vehicle, the height of greater than zero means that the robot moves over the sky higher the horizontal plane. In order to facilitate image matching, when the robot encounters a right angle, the processor 42 controls the robot to capture the images of the predefined region at a right angle first, rotate inc 90 degrees in situ while keeping horizontal so that the robot is located on the next trajectory connected with the right angle, capture the images of the predefined region again after the robot rotates for 90 degrees, and then continue to move along the next trajectory.

In another embodiment, accordance with actual needs, if the photographing frequency of the robot is not fixed, in order to realize a more accurate three-dimensional reconstruction, a photographing area overlap ratio corresponding to the images captured by the robot in the adjacent time period needs to be higher than a photographing area overlap ratio of the images captured in the non-adjacent time period for a certain threshold, that is, the photographing areas corresponding to the images captured in the adjacent time period are at least partially identical, which is not limited herein.

In which, the initial position estimation includes a three-dimensional coordinates and a three-dimensional space angle of the images, the processor 42 sets the three-dimensional coordinates and the three-dimensional space angle of the robot when capturing the images. In one embodiment, the image processing system further includes sensors, such that the initial position estimation can be obtained through the sensors, for instance, obtaining the three-dimensional coordinates through a location sensor (e.g., a GPS sensor) and obtaining the three-dimensional space angle through an angle sensor (e.g., a gyroscope).

In this embodiment, the processor 42 can obtain a robot movement data model through positioning information of the robot itself when capturing the images, the movement manner of the robot, and the preset movement trajectory, and calculate position information of the robot, thereby further obtaining the three-dimensional coordinate and the three-dimensional space angle of the robot, that is, the initial position estimation of the images, when the robot captures the images.

Specifically, the processor 42 can obtain the three-dimensional coordinates of the robot by performing weighted averaging on photographing positioning information of the robot and the calculated position information of the robot, the weight of the three-dimensional coordinates can be determined through the uncertainty of the data, or select the most accurate weight of the three-dimensional coordinates as the weight for calculating the three-dimensional coordinates from multiple weight ratios of the preset photographing positioning information and the calculated position information of the robot.

In other embodiments, the three-dimensional coordinates of the images may also be obtained through other methods such as Kalman filtering or other filtering methods, which is not limited herein.

In this embodiment, three-dimensional space angle information of the robot may be determined by inertial measurement unit (IMU) information of the robot itself and preset movement posture information of the robot when the robot captures the images. Preferably, in order to simplify the calculation amount, the robot keeps a horizontal posture to move while the robot moves along the preset movement trajectory.

After the processor 42 obtains the initial, position estimation of the images, the photographing area corresponding to the images may be obtained according to the initial position estimation, and whether the photographing areas of any two images are overlapped is determined. If they overlap, the two images may theoretically be combined into the corresponding image pair. However, since the images obtained by the processor 42 according to the initial position estimation may not be accurately corresponding to the photographing area, it is necessary to further determine whether the two images can form the image pair by determining whether the two images have an identical regional feature. If the identical regional feature exists in the two images, the two images are determined as one set of the image pairs.

Specifically, the processor 42 extracts one regional feature of one of the two images of the image pair, and determines the position of the regional feature in the other image according to the initial position estimation of the two images. In order to reduce the possible error, the robot searches in the predefined region of the position to determine that whether the identical regional feature exists in the other image. In a preferred embodiment, the predefined region is an area centered on the above-mentioned position. If there is the identical regional feature in the predefined region, the processor 42 determines that the two images include the same region, the two images are composed as a set of image pairs.

If the identical regional feature is not matched in the predefined region of the other image, the processor 42 rotates the other image to obtain the initial position estimation after the image is rotated, re-determines the position of the regional feature of the images in the other image according to the initial position estimation after the rotation, and further searches in the predetermined of the above-mentioned position in the other image to determine that whether the identical regional feature exists. If it exists, the two images may be combined into the image pair. In which, the angle and direction of the rotation can be set in advance according to the movement trajectory and a movement posture of the robot, for instance, rotates for 30 degrees, 35 degrees, or 90 degrees in each time, while the rotation direction is clockwise or counterclockwise.

If the identical regional feature is still not had been detected in the predefined region of the two images, the processor 42 uses a global search matching method to match one of the images with all the images captured by the robot to obtain the image(s) having the identical regional features as the image, and combines the two images into the image pair.

In comparison with the conventional method that searches through global search directly, the method that determining whether the two images can form the image pair by determining whether the images of the same area contain the identical regional features first, in addition to quickly eliminate the image pair winch is impossible to match and reduce the probability of mismatching, the complexity of the image matching in a system can be reduced from $O(n*n)$ to $O(n)$, which effectively reduces the workload of image matching and improves the efficiency of three-dimensional reconstruction.

In this embodiment, the internal parameters of a camera may include the focal length, the resolution, the radial direction, the camera distortion coefficient, and the like which are the data may be used for three-dimensional reconstruction, which is not limited herein.

In this embodiment, the processor 42 can use an oriented fast and rotated brief (ORB) algorithm to extract features Through the ORB algorithm, the feature extraction can be speeded up without reducing the accuracy of the regional feature of the captured images, which not causes impacts in the subsequent processing.

In other embodiments, the processor 42 may adopt other feature extraction algorithms, for example, algorithms based on template, edge, grayscale, and space, according to a motion model and the movement posture of the robot, to extract the predefined regional feature of each image, which is not repeated again herein.

In the above-mentioned embodiment, the extracted predefined regional feature of each image may be the predefined regional feature such as a grayscale, an angle, an edge, a region, a ridge of the image which may be used for computer recognition and classification, which is not repeated again herein.

Specifically, the processor 42 determined whether a part of the image pairs which not have the identical regional feature with the other image pairs exists, based on the initial position estimation of the images captured by the robot. If the part of the image pairs which not have the identical regional feature with the other image pairs exists, the part of the image pairs is deleted; the images which have the identical regional feature between any two images are obtained from the remaining image pairs, and the images with the identical regional feature are placed in a same image seed.

After deleting the part of the image pairs which not have the identical regional feature with the other image pairs, the processor 42 forms the image seed through the remaining image pairs.

In this embodiment, the processor 42 can construct the image seed by generating a undirected graph G=(V, E) based on the remaining image pairs. Specifically, in the undirected graph G=(V, E), each vertex represents one image, and the line between two vertices represents that there is an identical regional feature between two of the images, that is, an image pair is formed. Correspondingly, after generating the undirected graph based on the remaining image pairs, a fully connected subgraph the undirected graph, that is, the fully connected suhgraph including the largest number of images is obtained, and an image set corresponding to tlae fully connected suhgraph is taken as one image seed R1. FIG. 2 is a schematic diagram of an embodiment of an image seed obtained in the image processing method of FIG. 1. As shown in FIG. 2, in FIG. 2, two of the images having the identical regional feature are connected by a line, and it can be seen that the images 201, 202, 203, and 204 have the identical regional feature as any other image, that is, the image pair composed of any two images in FIG. 2 have the identical regional feature with the image pair composed of any other two images, therefore, the images 201, 202, 203 and 204 are placed in one image seed 301.

After obtaining the image seed 301, the image(s) included in the image seed 301 in the undirected graph is removed, and the processor 42 continuously searches the fully connected subgraph containing the largest number of images from the remaining images of the undirected graph, and takes the image set corresponding to the fully connected subgraph as a new image seed. Repeating the above-mentioned steps, the image seeds 301, 302, 303, and 304 shown FIG. 3 can be therefore obtained. In this embodiment, the number of the image seeds may be set to be less than a predetermined value in advance, where the predetermined value may be set to 3, 4, or other numbers according to actual needs, which is not limited herein. Of course, it is also possible not to set the predetermined value and repeats the above-mentioned steps until new image seeds can not be found in the undirected graph.

In a preferred embodiment, in order to improve the position optimization efficiency, the processor 42 performs position optimization on a plurality of image seeds in a parallel manner.

In a specific embodiment, after the processor 42 obtains a plurality of image seeds, taking the four image seeds in FIG. 3 as an example, the processor 42 processes the obtained four image seeds through the bundle adjustment in a parallel manner first, and performs a iteratively processing through the bundle adjustment to obtain the position estimation of the images after obtaining an estimated positon of each image in each image seed through the bundle adjustment. In which, the estimated positon of the image is a back projection error obtained through the initial position estimation of the image plus a regular term, and the position estimation of the image is the photographing position and the three-dimensional space angle after the image optimization.

Since the initial position estimation is obtained by auxiliary information of the robot, for example, GPS, trajectory design, and IMU data, it is closer to the actual photographing position of the robot. Therefore, it is more accurate to obtain the estimated position of the images according, to the initial position estimation. When iterative processing is performed to obtain the position estimation of the images, performing iterative processing with the estimated positon as the starting point will greatly reduce the number of convergence and reduce the calculation time.

In a specific embodiment, after the processor 42 performs the bundle adjustment processing on the four image seeds 301, 302, 303, and 304 of the above-mentioned embodiment to obtain the position estimation of the images of each image seed, the four image seeds are farmed as an image subset 305, each image seed is taken as an entirety, the relative positional relationship between the image seeds is obtained based on the position estimation of the images in the image seed, and the relative positional relationship between the image seeds 301, 302, 303, and 304 is marked as an edge constraint between the image seeds. The edge constraint between the image seeds 301, 302, 303, and 304 is taken as the initial location, and an accurate photographing position of the images in the image seed is obtained by performing a global bundle adjustment processing on the position estimation of all the images captured by the robot based on the initial location. In which, the accurate photographing position includes a three-dimensional coordinate and a three-dimensional space angle of a camera when the robot captures images.

In this embodiment, the method for the processor 42 to obtain the relative positional relationship between the image seeds 301, 302, 303, and 304 includes: determining whether any it in one image seed includes an identical regional feature with the images of another image seed, and if it includes, the corresponding photographing position and the photographing area of the image are obtained based on the position estimation of the image (of the another image seed) including the identical regional feature, so as to obtain the relative positional relationship of the image including the identical regional feature. The relative positional relationship is a relative positional relationship between the two image seeds.

In the above-mentioed embodiment, the present disclosure, obtains the accurate photographing position of each image through the bundle adjustment. In other embodiments, other algorithms capable of extracting the accurate photographing position of the images from the multi-view information may also be adopted, which is not limited herein.

The advantageous effects of the preset disclosure are as follows. Different from the prior art, when the robot captures images at the preset photographing frequency, the present disclosure obtains the initial position estimation of each image, and combines two images having a same region based on the initial position estimation to reduce the image matching complexity. The image seed is produced based on the image pair, the position optimization is performed on the image seed, the image subset is produced based on the optimized image seed, and the position optimization is performed on the image subset based on the image seeds in each image subset, which is capable of further reducing the computational complexity of image matching in an effective manner, reducing the calculation time, and improving the accuracy of image processing.

Figure 5:
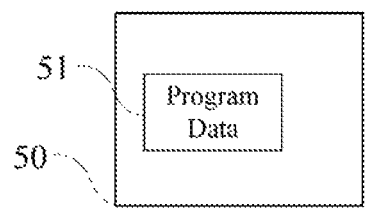
FIG. 5 is a schematic diagram of an embodiment of a device with a storage function according to the present disclosure.

Based on the same inventive concept, the present disclosure further provides a device with a storage function. FIG. 5 is a schematic diagram of an embodiment of a device with a storage function according to the present disclosure As shown in FIG. 5, a device 50 with a storage function stores program data 51. The program data 51 may be program(s) or instruction(s) for implementing any of the above-mentioned image processing methods. in one embodiment, the device with the storage function may be a storage chip in a terminal device, a hard disk, or other readable, writable, and storable device such as a portable bard disk, a USB flash drive, an optical disk, a server, and the like.

In the embodiments provided by the present disclosure, it should be understood that the disclosed method, system and device may be implemented in other manners. For example, the above-mentioned device embodiment is merely exemplary. For example, the division of processor or memory is merely a logical functional division, and other division manner may be used in actual implementations, that is, the functions implemented by multiple processors and memories may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer-readable storage medium. Based on this understanding, the technical solution of the present disclosure can basically be implemented in the form of a software product, in other words, a portion of the technical solution which contributes to the prior art or all or part of the technical solution can be implemented in the form of a software product. The computer software product is stored in a storage medium and includes instructions for causing a computer device (which may be a personal computer, a server, or a network device, etc.) or a processor to perform all in a part of the steps of the method of each embodiment of the present disclosure. The above-mentioned storage medium includes: a USB disk, a mobile hard disk, a read-only memory (ROM), a random access memory (RAM), a magnetic disk, an optical disk, or other medium for storing program codes.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding, technical schemes depart from the spirit and scope of the technical schemes of each of the embodiments of the present disclosure, and, should be included within the scope of the present disclosure.

What is claimed is:

1. A computer-implemented image processing method, comprising executing on a processor steps of:
    obtaining images of a target environment captured by a robot in a preset movement trajectory according to a predefined condition;
    combining every two of the images having a same region into a corresponding image pair based on an initial position estimation of each of the images;
    producing an image seed based on the image pair, wherein each image seed has a plurality of image pairs, and any image of each image pair in the image seed has at least one identical regional feature with an image of another image pair in the image seed;
    performing position optimization on the image seed;
    producing an image subset based on the image seed after the position optimization, wherein the image subset has a plurality of image seeds, and at least one identical regional feature exists between adjacent image seeds; and
    performing position optimization on the image subset based on the image seeds in the image subset.

2. The method of claim 1, wherein the step of performing position optimization on the image seed comprises:
    performing position optimization on the image seed in a parallel manner.

3. The method of claim 1, wherein the step of obtaining the images of the target environment captured by the robot in the preset movement trajectory according to the predefined condition comprises:
    obtaining a three-dimensional coordinate and a three-dimensional space angle of each of the images, in response to the robot capturing an image of a predefined region along the preset movement trajectory in a preset photographing frequency;

the step of combining the every two of the images having the same region into the corresponding image pair based on the initial position estimation of each of the images comprises:

combining the every two of the images having the same region into the corresponding image pair based on the three-dimensional coordinate and the three-dimensional space angle of each of the images.

4. The method of claim 3, wherein the step of obtaining the three-dimensional coordinate and the three-dimensional space angle of each of the images, in response to the robot capturing the image of the predefined region along the preset movement trajectory in the preset photographing frequency comprises:

determining the three-dimensional coordinates of each of the images based on positioning information when the robot captures the images and motion model data of the robot; and determining the three-dimensional space angle of the images based on inertial measurement unit information when the robot captures the images and preset robot posture information of the robot.

5. The method of claim 1, wherein the step of producing the image seed based on the image pair comprises:

determining whether a part of the image pairs not having an identical regional feature with the other image pairs exists based on the initial position estimation of the images captured by the robot;

deleting the part of the image pairs, if exists; and obtaining the images having an identical regional feature between any two images from the remaining image pairs, and placing the images in one image seed.

6. The method of claim 1, wherein the step of combining the every two of the images having the same region into the corresponding image pair based on the initial position estimation of each of the images comprises:

determining a photographing area of the images based on the initial position estimation of the image, and obtaining two images having the overlapped photographing area;

determining whether an identical regional feature exists in the two images; and determining the two images as one image pair if the identical regional feature exists in the two images.

7. The method of claim 6, wherein the step of determining whether the identical regional feature exists in the two images comprises:

extracting the regional feature of one of the two images;

determining the position of the regional feature in another of the two images based on the initial position estimation of the two images;

determining whether the regional feature exists in a predefined region of the position in the another of the two images; and determining the two images as one image pair, in response to the regional feature exists in the predefined region.

8. The method of claim 7, wherein after the step of determining whether the regional feature exists in the predefined region of the position in the another of the two images further comprises;

rotating one of the two images, in response to the regional feature not existing in the predefined region determining whether the rotated image and the another of the two images have the identical regional feature; and determining the two images as one image pair, in response to the two images having the identical regional feature.

9. The method of claim 5, wherein the step of obtaining the images having the identical regional feature between any two images from the remaining image pairs, and placing the images in one image seed comprises:

generating an undirected graph G=(V, E) based on the remaining image pairs, wherein each vertex of the undirected graph represents an image, and the line between two vertices represents an identical regional feature between two of the images; and obtaining a fully connected subgraph in the undirected graph, and taking an image corresponding to the fully connected subgraph as the image seed.

10. The method of claim 1, wherein the step of performing the position optimization on the image seed comprises:

performing an iterative processing on an estimated position of the images in the image seed through bundle adjustment, and further obtaining the position estimation of the images, wherein the estimated position is a back projection error of the initial position estimation of the images plus a regular term.

11. The method of claim 1, wherein the step of performing position optimization on the image seed comprises:

obtaining, a relative positional relationship between the image seeds, and performing position optimization on the image subset based on the position estimation of each of the images and the relative positional relationship between the image seeds.

12. The method of claim 1, wherein the initial position estimation is obtained through sensors of the robot.

13. An image processing system, comprising a communication circuit, a processor, a memory, and one or more computer programs;

wherein the communication circuit is configured to obtain and transmit instructions, the processor is configured to execute the one or more computer programs;

wherein the memory is configured to store images, image information of images, one or more preset photographing frequencies, one or more specific photographing positions, one or more initial position estimations, one or more photographing parameters of a robot, one or more image pairs, one or more identical regional features, one or more image seeds, one or more image subsets, image capturing positions, the one or more computer programs executed by the processor, and intermediate data generated when the one or more computer programs is executed;

wherein the one or more programs comprise:

instructions for obtaining images of a target environment captured by a robot in a preset movement trajectory according to a predefined condition;

instructions for combining every two of the images having a same region into a corresponding image pair based on an initial position estimation of each of the images;

instructions for producing an image seed based on the image pair, wherein each image seed has a plurality of image pairs, and any image of each image pair in the image seed has at least one identical regional feature with any image of another image pair in the image seed;

instructions for performing position optimization on the image seed;

instructions for producing an image subset based on the image seed after the position optimization, wherein the image subset has a plurality of image seeds, and at least one identical regional feature exists between adjacent image seeds; and instructions for performing position optimization on the image subset based on the in seeds in the image subset.

14. The system of claim 13, wherein the instructions for performing position optimization on the image seed comprise:
  instructions for performing position optimization on the image seed in a parallel manner.

15. The system of claim 13, wherein the instructions for obtaining the images of the target environment captured by the robot in the preset movement trajectory according to the predefined conditim comprise:
  instructions for obtaining a three-dimensional coordinate and a three-dimensional space angle of each of the images, in response to the robot capturing an image of a predefined region along the preset movement trajectory in a preset photographing frequency;
  the instructions for combining the every two of the images having the same region into the corresponding image pair based on the initial position estimation of each of the images comprise:
  instructions for combining the every two of the images having the same region into the corresponding image pair based on the three-dimensional coordinate and the three-dimensional space angle of each of the images.

16. The system of claim 15, wherein the instructions for obtaining the three-dimensional coordinate and the three-dimensional space angle of each of the images, in response to the robot capturing the image of the predefined region along the preset movement trajectory in the preset photographing frequency comprise:
  instructions for determining the three-dimensional coordinates of each of the images based on positioning information when the robot captures the images and motion model data of the robot; and
  instructions for determining the three-dimensional space angle of the images based on inertial measurement unit information when the robot captures the images and preset robot posture information of the robot.

17. The system of claim 13, wherein the instructions for producing the image seed based on the image pair comprise:
  instructions for determining whether a part of the image pairs not having an identical regional feature with the other image pairs exists based on the initial position estimation of the images captured by the robot;
  instructions for deleting the part of the image pairs, if exists; and
  instructions for obtaining the images having an identical regional feature between any two images from the remaining image pairs, and placing the images in one image seed.

18. The system of claim 13, wherein the instructions for combining the every two of the images having the same region into the corresponding image pair based on the initial position estimation of each of the images comprise:
  instructions for determining a photographing area of the images based on the initial position estimation of the image, and obtaining two images having the overlapped photographing area;
  instructions for determining whether an identical regional feature exists in the two images; and
  instructions for determining the two images as one image pair if the identical regional feature exists in the two images.

19. The system of claim 13, wherein the instructions for performing the position optimization on the image seed comprise:
  instructions for performing an iterative processing on an estimated positon of the images in the image seed through bundle adjustment, and further obtaining the position estimation of the images, wherein the estimated positon is a back projection error of the initial position estimation of the images plus a regular term.

20. The system of claim 13, wherein the system further includes one or more sensors, the initial position estimation is obtained through the one or more sensors.

\* \* \* \* \*